US010402707B2

(12) United States Patent
Garak

(10) Patent No.: US 10,402,707 B2
(45) Date of Patent: Sep. 3, 2019

(54) INTERACTIVE OPTICAL CODE CREATION

(71) Applicant: Justin Garak, Toronto (CA)

(72) Inventor: Justin Garak, Toronto (CA)

( * ) Notice: Subject to any disclaimer, the term of this patent is extended or adjusted under 35 U.S.C. 154(b) by 169 days.

(21) Appl. No.: 15/398,568

(22) Filed: Jan. 4, 2017

(65) Prior Publication Data

US 2018/0189619 A1 Jul. 5, 2018

(51) Int. Cl.

| | |
|---|---|
| ***G06F 3/0484*** | (2013.01) |
| ***G06F 3/0488*** | (2013.01) |
| ***G06K 19/06*** | (2006.01) |
| ***G06F 3/00*** | (2006.01) |
| ***G06K 7/14*** | (2006.01) |

(52) U.S. Cl.

CPC ....... *G06K 19/06037* (2013.01); *G06F 3/002* (2013.01); *G06F 3/04845* (2013.01); *G06F 3/04847* (2013.01); *G06F 3/04886* (2013.01); *G06K 7/1417* (2013.01)

(58) Field of Classification Search

CPC combination set(s) only.
See application file for complete search history.

(56) References Cited

U.S. PATENT DOCUMENTS

| | | | | |
|---|---|---|---|---|
| 6,993,655 | B1 * | 1/2006 | Hecht | G06K 7/143 235/468 |
| 2006/0106623 | A1 | 5/2006 | Lebaschi | |
| 2009/0154759 | A1 * | 6/2009 | Koskinen | G06F 3/147 382/100 |
| 2011/0082747 | A1 * | 4/2011 | Khan | G06Q 10/00 705/14.58 |
| 2012/0038547 | A1 | 2/2012 | Fein | |
| 2013/0112760 | A1 | 5/2013 | Schory | |
| 2013/0211891 | A1 * | 8/2013 | Daniel | G06Q 30/0214 705/14.16 |
| 2014/0282210 | A1 | 9/2014 | Bianconi | |
| 2015/0294130 | A1 * | 10/2015 | Stein | G06K 7/1443 235/462.09 |
| 2015/0294207 | A1 | 10/2015 | Stein | |
| 2017/0249689 | A1 * | 8/2017 | O'Neill | G06Q 30/0635 |

OTHER PUBLICATIONS

International Application No. PCT/US2017/016830, International Search Report and Written Opinion dated Apr. 13, 2017.

* cited by examiner

*Primary Examiner* — Rayeez R Chowdhury
(74) *Attorney, Agent, or Firm* — Ahmann Kloke LLP

(57) ABSTRACT

An optical code interface is provided for interactively creating one or more optical codes, the optical code interface including a control object for configuring a desired optical code aesthetic of the one or more optical codes. Content is obtained in response to user input received through the optical code interface. A first portion of a continuous input is received through the optical code interface in response to a first manipulation of the control object. An optical code is generated based on the first portion of the continuous input and the content. The optical code is presented through the optical code interface. A second portion of the continuous input is received through the optical code interface in response to a second manipulation of the control object. The optical code is based on the second portion of the continuous input. The updated optical code is presented through the optical code interface.

20 Claims, 14 Drawing Sheets

INTERACTIVE OPTICAL CODE CREATION

DETAILED DESCRIPTION

Figure 1:
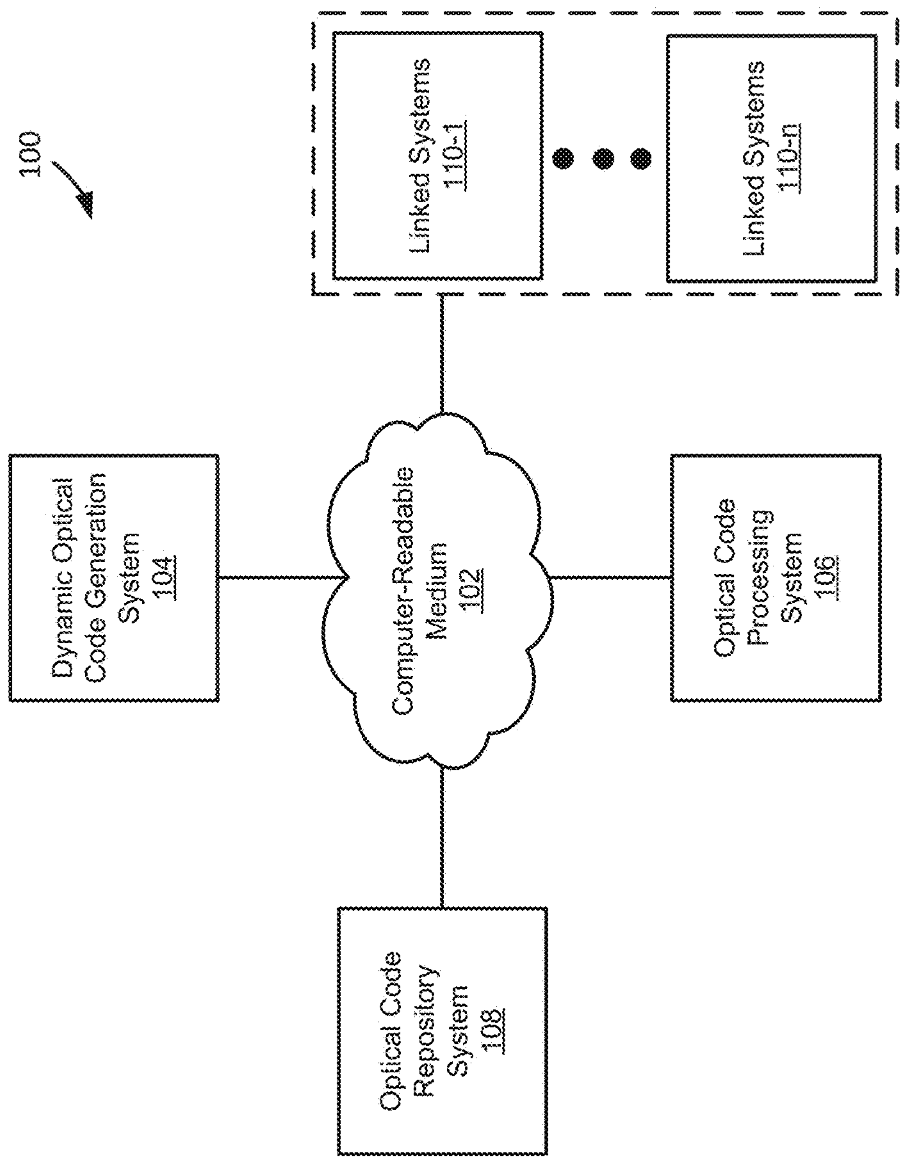
FIG. 1 depicts a diagram of an example of a system for interactively creating optical codes.

FIG. 1 shows a diagram 100 of an example of a system for interactively creating optical codes. The example system shown in FIG. 1 includes a computer-readable medium 102, a dynamic optical code generation system 104, an optical code processing system 106, an optical code repository system 108, and linked system 110-1 to 110-*n* (individually, the linked system 110, collectively, the linked systems 110).

In the example of FIG. 1, the dynamic optical code generation system 104, the optical code processing system 106, the optical code repository system 108, and the linked system 110 are coupled to the computer-readable medium 102. As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The computer-readable medium 102 and other applicable systems or devices described in this paper can be implemented as a computer system, a plurality of computer systems, or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, Ethernet interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some implementations, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

In the example of FIG. 1, the dynamic optical code generation system 104 functions to interactively create optical codes having desired optical code aesthetics (e.g., particular visual appearances). For example, the functionality of the dynamic optical code generation system 104 can be implemented by one or more mobile computing devices (e.g., smartphones, cell phones, smartwatches, tablet computers, and the like) or other computing devices. As used in this paper, an optical code comprises a machine-readable optical object (e.g., a multi-dimensional barcode) having a desired optical code aesthetic, and contains information associated with one or more subjects. For example, a subject can include one or more persons, companies, organizations, or other entities, and information can include one or more content items. In a specific implementation, content items can include identifier items (e.g., name, email address, phone number, mailing address, or uniform resource identifiers), media items (e.g., images, pictures, video, or audio), social network items (e.g., user profiles and related data), executable items (e.g., computer programs or applications), or other data associated with a subject. It will be appreciated that content items can include information data (e.g., image data of a picture of a subject) or links (e.g., hyperlinks or other type of pointers) to information data.

In a specific implementation, the dynamic optical code generation system 104 functions to encode information within various regions of an optical code. For example, the dynamic optical code generation system 104 can encode an identifier item in a first region of an optical code, a media item in a second region of the optical code, a social network item in a third region of the optical code, and so forth. The dynamic optical code generation system 104 can be configured to encode information using various types of encoding, such as binary encoding, alphanumeric encoding, or otherwise.

In a specific implementation, the dynamic optical code generation system 104 functions to interactively create optical codes that are both machine-readable and human-readable. More specifically, optical codes that are human-readable can visually indicate information associated with the optical code without requiring a computing device to extract the information. For example, a person's name printed on a business card can be an optical code associated with that person.

In a specific implementation, the dynamic optical code generation system 104 functions to provide an optical code interface for interactively creating an optical code. For example, the optical code interface can include one or more graphical user interfaces (GUIs) configured to receive user input for creating optical codes, obtain information for encoding within optical codes, and present optical codes. In a specific implementation, the optical code interface presents a graphical object (e.g., a button or knob) that can be manipulated by a user to interactively create an optical code. For example, a user can manipulate the graphical object along an x-axis, y-axis, or z-axis to define a desired optical code aesthetic of an optical code. Example optical code interfaces and example optical codes are depicted in FIGS. 9A-D and FIG. 11.

As used herein, user inputs can include button presses, button holds, gestures (e.g., taps, holds, swipes, pinches, etc.), and the like. In a specific implementation, user inputs include continuous inputs. A continuous input is a sequence of user inputs that are performed without the user losing physical contact with the associated input device (e.g., a touchscreen) between user inputs. For example, a continuous input can include a sequence of gestures received by an input device without a user lifting their finger from the input device between gestures. This can allow, for example, inputs to be received and processed more efficiently than traditional user inputs.

In a specific implementation, the dynamic optical code generation system 104 functions to interactively create optical codes from an optical code template. For example, rather than creating an optical code from scratch, the dynamic optical code generation system 104 can identify an optical code template, and modify the optical code template to create an optical code including a desired set of content items and a desired optical code aesthetic. This can, for example, allow the dynamic optical code generation system 104 to efficiently reach a desired set of content items and a desired optical code aesthetic.

In the example of FIG. 1, the optical code processing system 106 functions to exploit optical codes. For example, the optical code processing system 106 can be implemented by one or more mobile computing devices (e.g., the same or different one or more mobile computing devices implementing functionality of a dynamic code generation system). In a specific implementation, the optical code processing system 106 captures an optical code (e.g., using a camera, scanner, or the like), extracts information associated with the optical code, and provides the information for presentation (e.g., to a user).

In the example of FIG. 1, the optical code repository system 108 functions to store optical codes. For example, the optical code repository system 108 can be implemented using a cloud-based storage platform (e.g., AWS), on one or more mobile computing devices (e.g., the one or more mobile computing devices implementing functionality of a dynamic optical code generation system), or otherwise. In a specific implementation, optical codes can include some or all of the following optical code attributes:

- Optical Code Identifier: identifies an optical code.
- Optical Code Aesthetic: an aesthetic of the optical code. The optical code aesthetic can include, for example, various shapes, patterns, colors, images, pictures, and the like.
- Optical Code Content: one or more content items encoded in corresponding regions of the optical code aesthetic.
- Subject Identifier(s): identifies one or more subjects associated with the optical code.
- Encoding Type: identifies a type of encoding used to create the optical code.

In a specific implementation, the optical code repository system 108 functions to store optical code templates. For example, optical code templates can include some or all of the following template attributes:

- Optical Code Template Identifier: identifies an optical code template.
- Optical Code Category: a category (e.g., business, entertainment, sports, or music) associated with an aesthetic of the optical code template. Optical code categories can be user defined or predetermined. Optical code categories can facilitate, for example, identification of optical code template that may be of interest to a user.
- Optical Code Template Aesthetic: the optical code associated with the optical code template.
- Optical Code Template Content: one or more content items encoded in corresponding regions of the optical code template aesthetic.
- Subject Identifier(s)
- Encoding Type It will be appreciated that in various implementations, an optical code template can be "blank." For example, a blank optical code template can include an optical code aesthetic without any encoded content items. Alternatively, optical code templates can include one or more content items in addition to an optical code aesthetic. For example, an optical code template can include a set of default content items (e.g., identifier items).

In the example of FIG. 1, the linked systems 110 function to provide information associated with optical codes. For example, the linked systems 110 may comprise web servers, social network systems (e.g., Facebook, Snapchat, Youtube, Twitter, Instragram, or Pinterest) and the like. In a specific implementation, the linked systems 110 provide information in response to an exploitation of an optical code. For example, a content item encoded within an optical code can include a link to a user profile (e.g., a Facebook user profile) maintained by a linked system 110 (e.g., a Facebook server), and the user profile, or portion thereof, can be provided in response to an exploitation of the optical code. In a specific implementation, the linked systems 110 provide information during optical code creation. For example, the linked systems 110 can provided information for encoding in an optical code.

Figure 2:
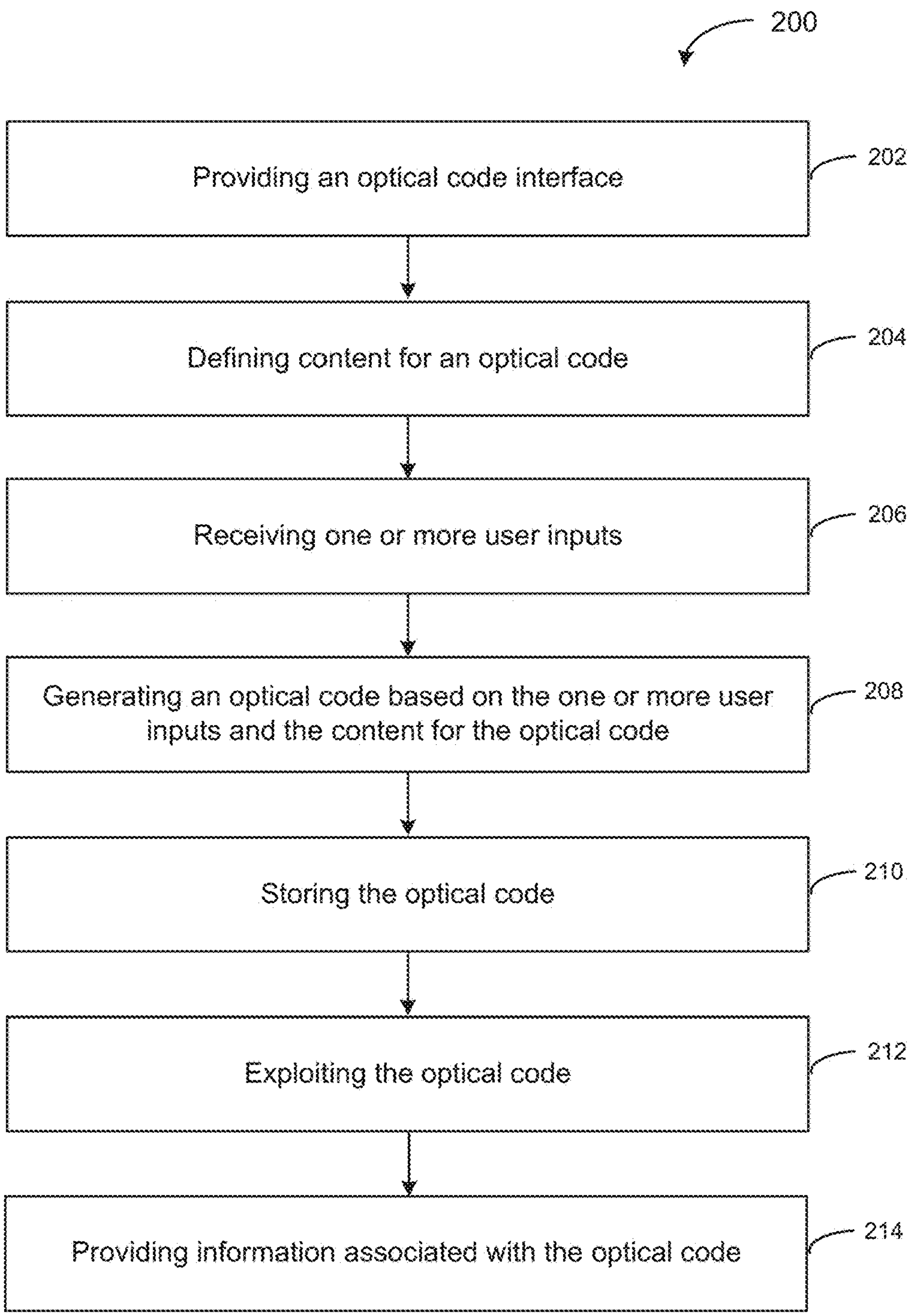
FIG. 2 depicts a flowchart of an example method for interactively creating an optical code.

FIG. 2 depicts a flowchart 200 of an example method for interactively creating an optical code. In this and other flowcharts described in this paper, the flowchart illustrates by way of example a sequence of modules. It should be understood the modules can be reorganized for parallel execution, or reordered, as applicable. Moreover, some modules that could have been included may have been removed to avoid providing too much information for the sake of clarity and some modules that were included could be removed, but may have been included for the sake of illustrative clarity.

In the example of FIG. 2, the flowchart 200 starts at module 202 where a dynamic optical code generation system provides an optical code interface for interactively creating an optical code. For example, the dynamic optical code generation system can generate a graphical user interface including a graphical control object for creating a desired optical code aesthetic of the optical code, and one or more attribute objects (e.g., a text-box) that can be used to specify content to include within the optical code.

In the example of FIG. 2, the flowchart 200 continues to module 204 where the dynamic optical code generation system defines content for an optical code. In a specific implementation, the dynamic optical code generation system defines one or more content items based on user input received through the optical code interface (e.g., via one or more attribute objects). For example, a user can provide content directly through the optical code interface (e.g., uploading an attachment), a user can provide links to content (e.g., content maintained by one or more linked systems) and the links can be treated as content, or a user can provide links to content and the dynamic optical code generation can obtain the content associated with the links.

In the example of FIG. 2, the flowchart 200 continues to module 206 where the dynamic optical code generation system receives one or more user inputs for defining an aesthetic of the optical code. For example, each of the one or more user inputs may comprise a portion of a continuous input. In a specific implementation, the one or more user inputs may include manipulating the graphical control object. For example, manipulating the graphical control object can include rotating the graphical control object, pushing the graphical control object, or pulling the graphical control object.

In the example of FIG. 2, the flowchart 200 continues to module 208 where the dynamic optical code generation system generates an optical code based on the one or more user inputs and the defined content for the optical code to create an optical code having a desired optical code aesthetic. In various implementations, module 208 is performed in parallel with module 206. For example, the dynamic optical code generation system can generate a respective control signal for each of the one or more user more inputs, and the respective control signals can each be based on a respective user input of the one or more user inputs. In various implementations, the dynamic optical code generation system uses the control signals to define a desired optical code aesthetic of an optical code.

In a specific implementation, the dynamic optical code generation system uses the control signals to encode information within an optical code in addition to defining an aesthetic of an optical code. For example, the dynamic optical code generation system can use the control signals to simultaneously, or at substantially the same time, define an aesthetic of an optical code and encode information within the optical code.

In the example of FIG. 2, the flowchart 200 continues to module 210 where an optical code repository system stores the optical code. In a specific implementation, the optical code can be stored as an optical code template (e.g., in response to user input received through the optical code interface).

In the example of FIG. 2, the flowchart 200 continues to module 212 where an optical code processing system exploits the optical code. For example, the optical code processing system can capture the optical code, identify content items within the optical code, and obtain information associated with the content items. In a specific implementation, the optical code processing system obtains some or all of the information from one or more linked systems.

In a specific implementation, the optical code processing system can capture optical codes in a variety of different environments. For example, the optical code processing system can capture optical codes printed on physical objects (e.g., a business card, a container, or other physical object) or presented through a display device (e.g., an LCD display).

In the example of FIG. 2, the flowchart 200 continues to module 214 where the optical code processing system presents information associated with the optical code. For example, the optical code processing system can present some or all of the information associated with one or more content items included or linked within the optical code. The information can be presented through a graphical user interface or other type of interface.

Figure 3:
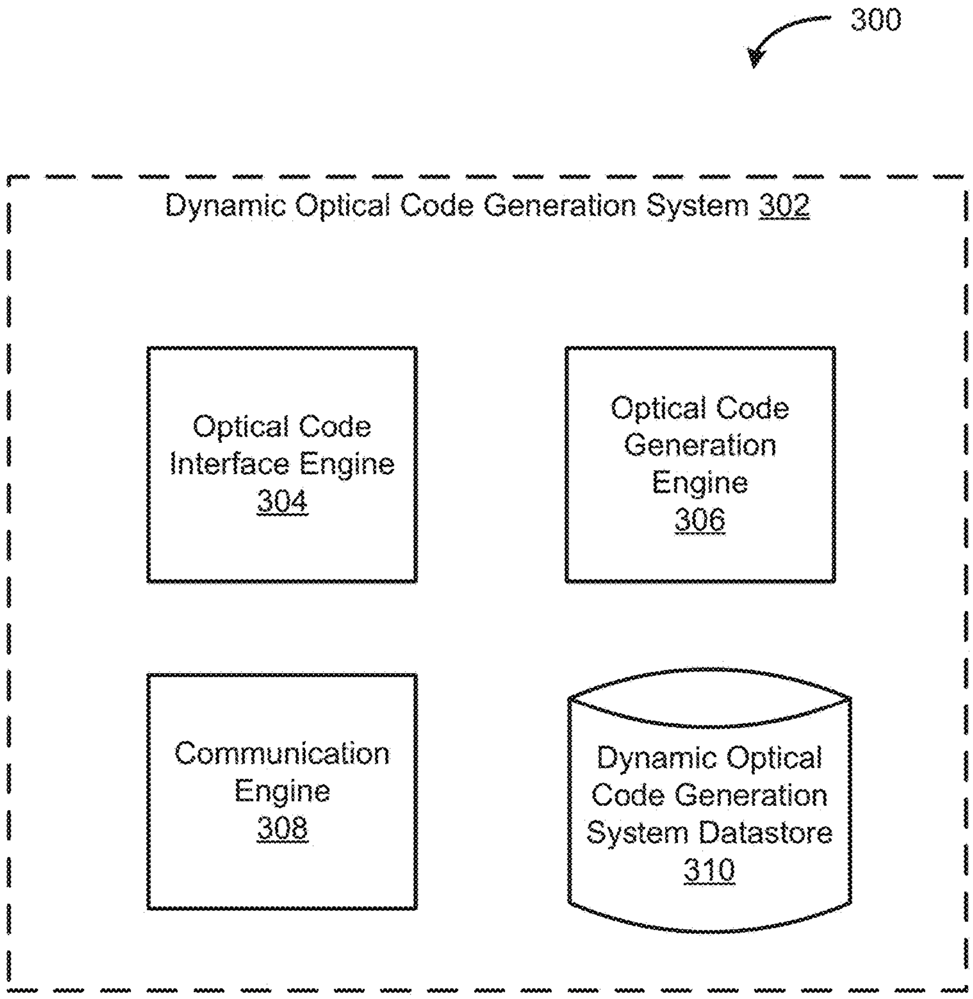
FIG. 3 depicts a diagram of an example of a dynamic optical code generation system.

FIG. 3 depicts a diagram 300 of an example of a dynamic optical code generation system 302. The dynamic optical code generation system 302 includes an optical code interface engine 304, an optical code generation engine 306, a communication engine 308, and a dynamic optical code generation system datastore 310.

In the example of FIG. 3, the optical code interface engine 304 functions to generate an optical code interface for interactively creating an optical code. The optical code interface can be used to obtain information to include within an optical code, define a desired optical code aesthetic of an optical code, and present an optical code (e.g., as it is being created). Examples of an optical code interface and example optical codes are shown in FIGS. 9A-D and FIG. 11.

In the example of FIG. 3, the optical code generation engine 306 functions to generate an optical code having a desired optical code aesthetic, and functions to associate information with an optical code having a desired optical code aesthetic. For example, the optical code generation engine 306 can generate an optical code having a desired optical code aesthetic in response to a continuous input received through an optical code interface, and encode one or more content items into various regions of the optical code.

In the example of FIG. 3, the communication engine 308 functions to send requests, transmit and, receive communications, and/or otherwise provide communication with one or a plurality of systems. In various implementations, the communication engine 308 functions to encrypt and decrypt communications. The communication engine 308 may function to send requests to and receive data from a system through a network or a portion of a network. Depending upon implementation-specific or other considerations, the communication engine 308 may send requests and receive data through a connection, all or a portion of which may be a wireless connection. The communication engine 308 may request and receive messages, and/or other communications from associated systems.

In the example of FIG. 3, the dynamic optical code generation system datastore 310 functions to store, at least temporarily, optical codes. For example, optical codes can be cached or buffered in the dynamic optical code generation system datastore 310 and provided to an optical code repository system for persistent storage. In other implementations, the dynamic optical code generation system datastore 310 functions to persistently store optical codes instead of, or in addition to, an optical code repository system.

Figure 4:
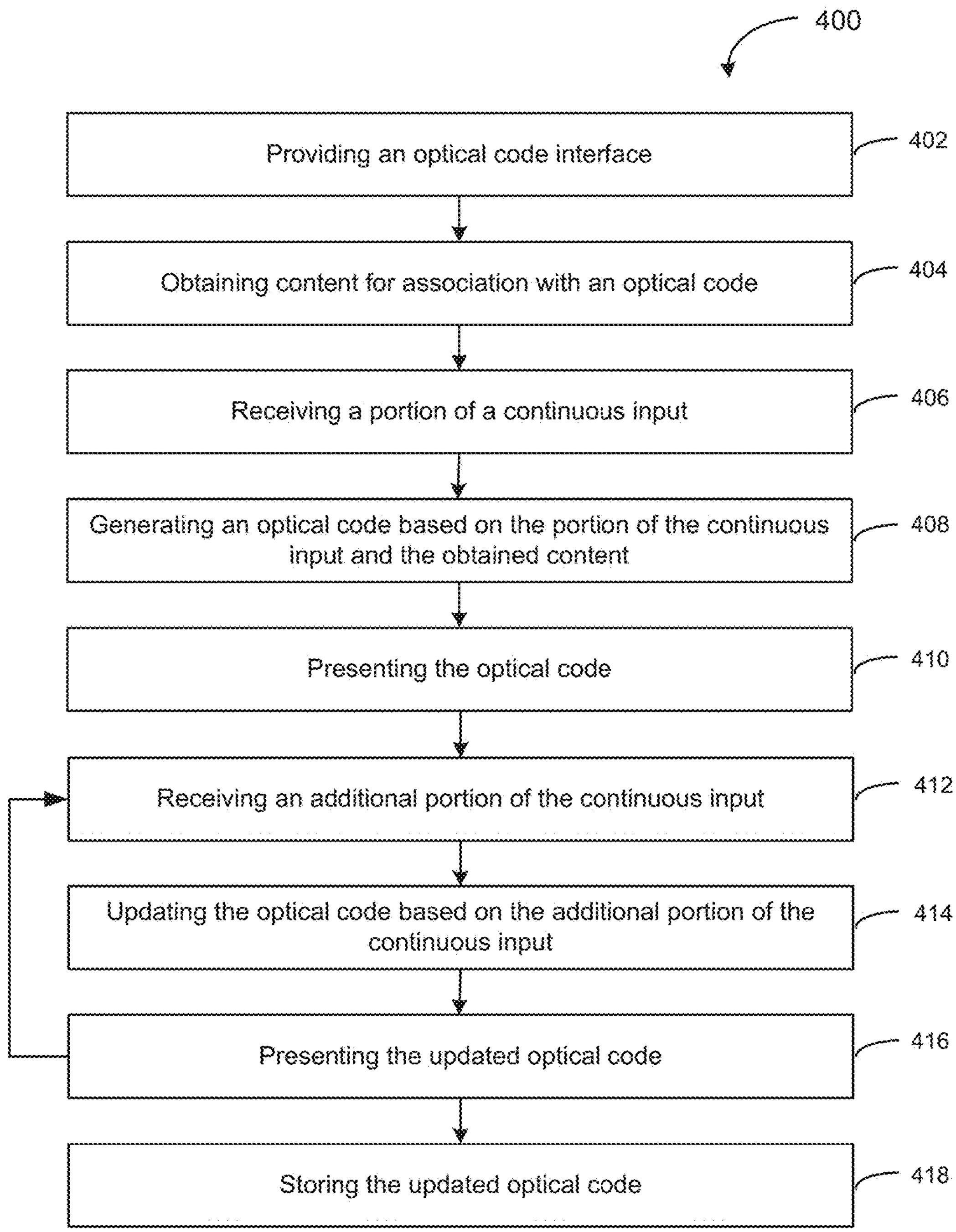
FIG. 4 depicts a flowchart of an example method for interactively creating an optical code.

FIG. 4 depicts a flowchart 400 of an example method for interactively creating an optical code.

In the example of FIG. 4, the flowchart 400 starts at module 402 where a dynamic optical code generation system provides an optical code interface. In a specific implementation, an optical code interface engine provides the optical code interface.

In the example of FIG. 4, the flowchart 400 continues to module 404 where the dynamic optical code generation system obtains content for association with an optical code. In a specific implementation, the optical code interface engine obtains the content.

In the example of FIG. 4, the flowchart 400 continues to module 406 where the dynamic optical code generation system receives a portion of a continuous input. In a specific implementation, the optical code interface engine receives the portion of the continuous input.

In the example of FIG. 4, the flowchart 400 continues to module 408 where the dynamic optical code generation system generates an optical code based on the portion of the continuous input and the obtained content. In a specific implementation, an optical code generation engine generates the optical code.

In the example of FIG. 4, the flowchart 400 continues to module 410 where the dynamic optical code generation system presents the optical code. In a specific implementation, the optical code interface engine presents the optical code.

In the example of FIG. 4, the flowchart 400 continues to module 412 where the dynamic optical code generation system receives an additional portion of the continuous input. In a specific implementation, the optical code interface engine receives the additional portion of the continuous input.

In the example of FIG. 4, the flowchart 400 continues to module 414 where the dynamic optical code generation system updates, or otherwise modifies, the optical code based on the additional portion of the continuous input. In a specific implementation, the dynamic optical code generation system updates the optical code.

In the example of FIG. 4, the flowchart 400 continues to module 416 where the dynamic optical code generation system presents the updated optical code. Modules 412-416 can be repeated until a desired optical code aesthetic is achieved. In a specific implementation, the optical code interface engine presents the updated optical code.

In the example of FIG. 4, the flowchart 400 continues to module 418 where the dynamic optical code generation system stores the updated optical code. In various implementations, a dynamic optical generation system datastore stores the updated optical code. In a specific implementation, a communication engine provides the updated optical for storage by an optical code repository system.

Figure 5:
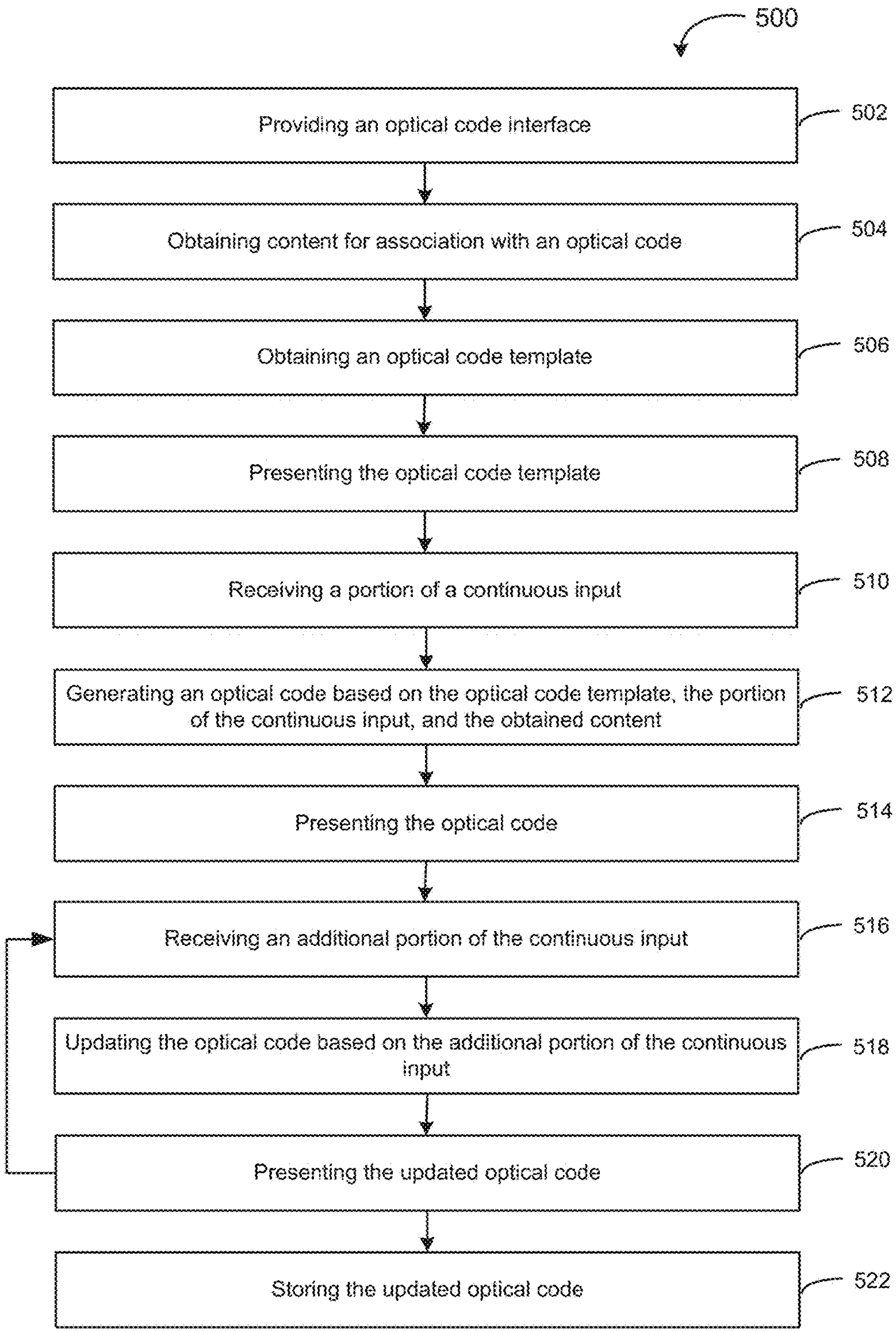
FIG. 5 depicts a flowchart of an example method for interactively creating an optical code using a template optical code.

FIG. 5 depicts a flowchart 500 of an example method for interactively creating an optical code using a template optical code.

In the example of FIG. 5, the flowchart 500 starts at module 502 where a dynamic optical code generation system provides an optical code interface. In a specific implementation, an optical code interface engine provides the optical code interface.

In the example of FIG. 5, the flowchart 500 continues to module 504 where the dynamic optical code generation system obtains content for association with an optical code. In a specific implementation, the optical code interface engine obtains the content.

In the example of FIG. 5, the flowchart 500 continues to module 506 where the dynamic optical code generation system obtain an optical code template. In a specific implementation, the optical code interface engine triggers a communication engine to obtain the optical code template. For example, the communication engine can obtain the optical code template from an optical code repository system based on an identifier of the optical code template or a category of the optical code template.

In the example of FIG. 5, the flowchart 500 continues to module 508 where the dynamic optical code generation system presents the optical code template. In a specific implementation, the optical code interface engine presents the optical code template.

In the example of FIG. 5, the flowchart 500 continues to module 510 where the dynamic optical code generation system receives a portion of a continuous input. In a specific implementation, the optical code interface engine receives the portion of the continuous input In the example of FIG. 5, the flowchart 500 continues to module 512 where the dynamic optical code generation system generates an optical code based on the optical code template, the portion of the continuous input, and obtained content. In a specific implementation, an optical code generation engine generates the optical code.

In the example of FIG. 5, the flowchart 500 continues to module 514 where the dynamic optical code generation system presents the optical code. In a specific implementation, the optical code interface engine presents the optical code.

In the example of FIG. 5, the flowchart 500 continues to module 516 where the dynamic optical code generation system receives an additional portion of the continuous input. In a specific implementation, the optical code interface engine receives the additional portion of the continuous input.

In the example of FIG. 5, the flowchart 500 continues to module 518 where the dynamic optical code generation system updates the optical code based on the additional portion of the continuous input. In a specific implementation, the dynamic optical code generation system updates the optical code.

In the example of FIG. 5, the flowchart 500 continues to module 520 where the dynamic optical code generation system presents the updated optical code. Modules 516-520 can be repeated until a desired optical code aesthetic is achieved. In a specific implementation, the optical code interface engine presents the updated optical code.

In the example of FIG. 5, the flowchart 500 continues to module 522 where the dynamic optical code generation system stores the updated optical code. In various implementations, a dynamic optical generation system datastore stores the updated optical code. In a specific implementation, a communication engine provides the updated optical code for storage by an optical code repository system.

Figure 6:
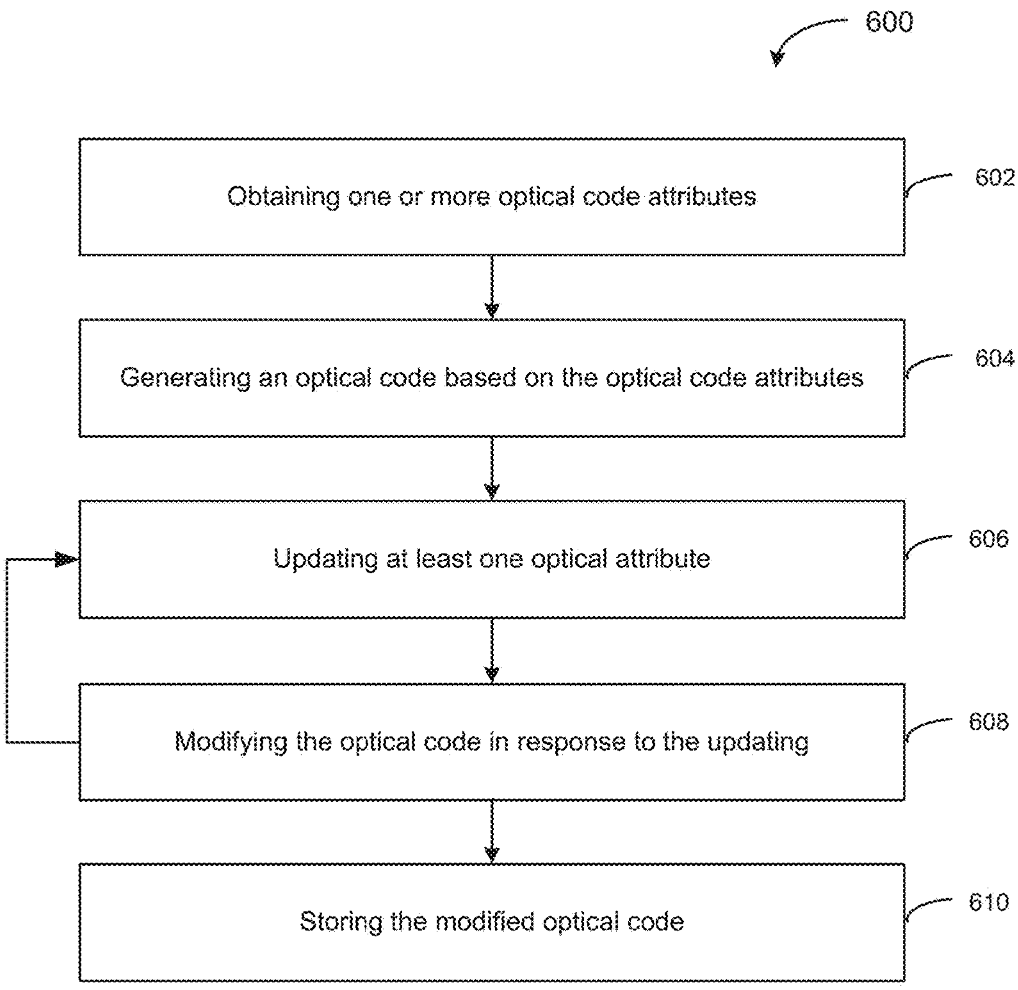
FIG. 6 depicts a flowchart of an example method for modifying an optical code.

FIG. 6 depicts a flowchart 600 of an example method for modifying an optical code.

In the example of FIG. 6, the flowchart 600 continues to module 602 where the dynamic optical code generation system obtains one or more optical code attributes. For example, the one or more optical code attributes can include any of an optical code identifier, an optical code aesthetic, one or more content items, an optical code template identifier, and an optical code encoding type. The optical code attributes can be obtained automatically (e.g., without requiring user input) or in response to user input (e.g., user input received through an optical code interface). In a specific implementation, an optical code interface engine obtains the one or more optical code attributes.

In the example of FIG. 6, the flowchart 600 continues to module 604 where the dynamic optical code generation system generates an optical code based on the optical code attributes. In a specific implementation, an optical code generation engine generates the optical code.

In the example of FIG. 6, the flowchart 600 continues to module 606 where the dynamic optical code generation system updates at least one optical code attribute. For example, the at least one optical attribute can be updated in response to user input received through an optical code interface. In a specific implementation, the optical code interface engine updates the at least one optical code attribute.

In the example of FIG. 6, the flowchart 600 continues to module 608 where the dynamic optical code generation system modifies the optical code in response to the updating. In a specific implementation, an optical code generation engine modifies the optical code. Modules 606 and 608 can be repeated until a desired optical code is achieved.

In the example of FIG. 6, the flowchart 600 continues to module 610 where the dynamic optical code generation system stores the modified optical code. In various implementations, a dynamic optical code generation system stores the modified optical code. In a specific implementation, a communication engine provides the modified optical code for storage by an optical code repository system.

Figure 7:
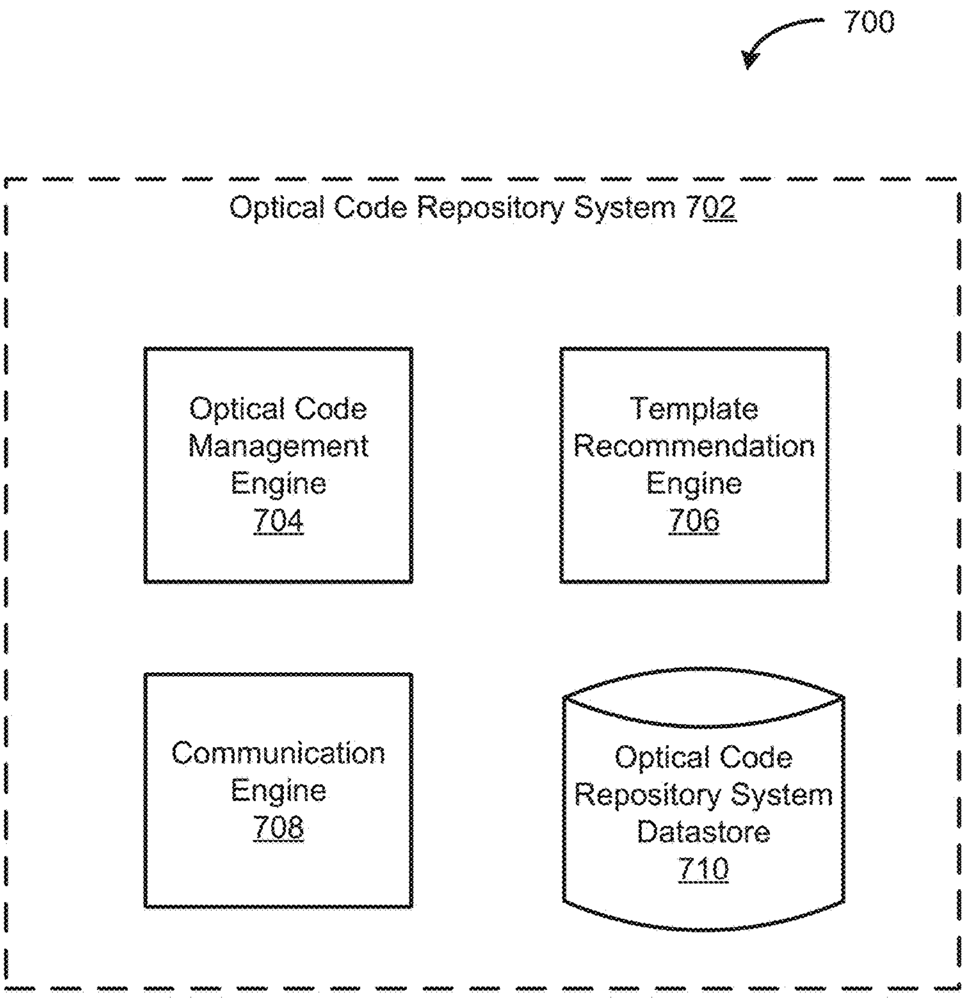
FIG. 7 depicts a diagram of an example of an optical code repository system.

FIG. 7 depicts a diagram 700 of an example of an optical code repository system 702. The optical code repository system 702 includes an optical code management engine 704, a template recommendation engine 706, a communication engine 708, and an optical code repository system datastore 710.

In the example of FIG. 7, the optical code management engine 704 functions to store and otherwise manage optical codes and optical code templates. For example, the optical code management engine 704 can store optical codes and optical code templates in the optical code repository system datastore 710. In a specific implementation, the optical codes and optical code templates are created by a dynamic optical code generation system and provided to the optical code repository system 702 for storage and management.

In the example of FIG. 7, the template recommendation engine 706 functions to select one or more optical code templates. For example, the template recommendation engine 706 can select an optical code template based on one or more optical code template attributes. In a specific implementation, the template recommendation engine 706 can parse an optical code template request message to identify one or more optical code template attributes included in the request message, and select an optical code template having matching, or substantially similar, corresponding attributes.

In the example of FIG. 7, the communication engine 708 functions to functions to send requests, transmit and, receive communications, and/or otherwise provide communication with one or a plurality of systems. In various implementations, the communication engine 708 functions to encrypt and decrypt communications. The communication engine 708 may function to send requests to and receive data from a system through a network or a portion of a network. Depending upon implementation-specific or other considerations, the communication engine 708 may send requests and receive data through a connection, all or a portion of which may be a wireless connection. The communication engine 708 may request and receive messages, and/or other communications from associated systems.

Figure 8:
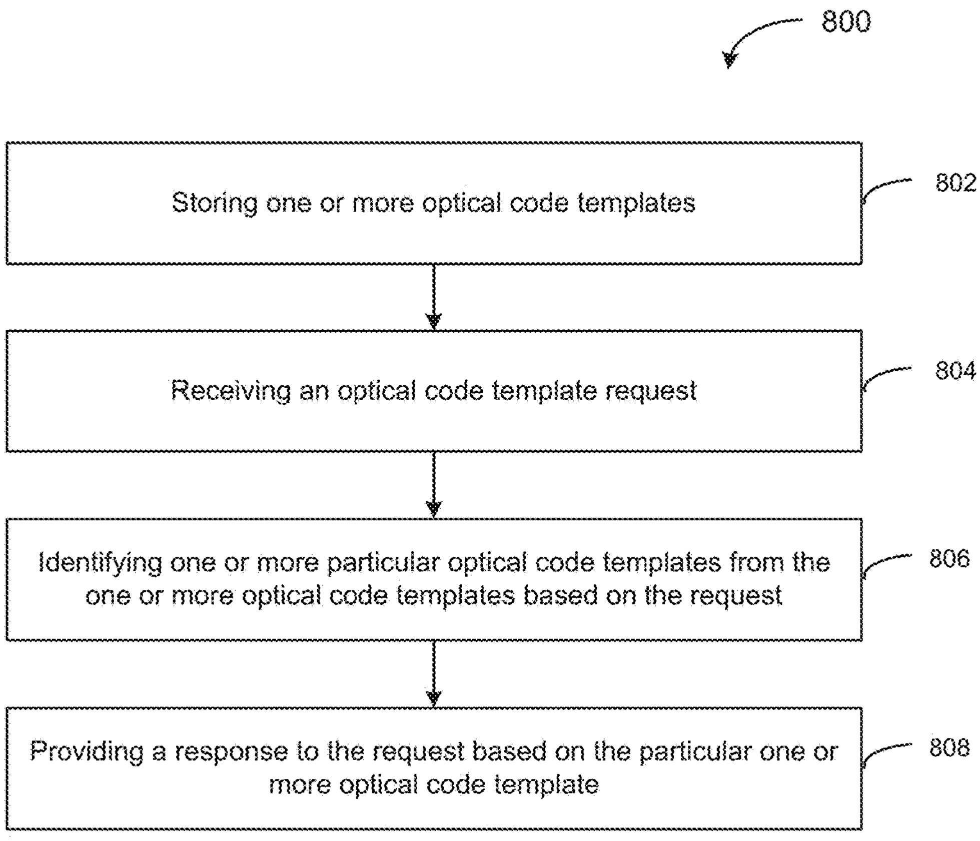
FIG. 8 depicts a flowchart of an example method for selecting an optical code template.

FIG. 8 depicts a flowchart 800 of an example method for selecting an optical code template.

In the example of FIG. 8, the flowchart 800 starts at module 802 where an optical code repository system stores one or more optical code templates. For example, an optical code template can be stored based on a category of the optical code template. In a specific implementation, an optical code management engine stores the one or more optical code templates in an optical code repository system datastore.

In the example of FIG. 8, the flowchart 800 continues to module 804 where the optical code repository system receives an optical code template request. The optical code template request may comprise one or more optical code attributes or optical code template attributes. In a specific implementation, a communication engine receives the optical code template request (e.g., from a dynamic optical code generation system).

In the example of FIG. 8, the flowchart 800 continues to module 806 where the optical code repository system identifies one or more particular optical code templates from the stored optical code templates based on the optical code template request. In a specific implementation, a template recommendation engine identifies the one or more particular optical code templates.

In the example of FIG. 8, the flowchart 800 continues to module 808 where the optical code repository system provides a response to the request based on the one or more particular optical code templates. In a specific implementation, the communication engine provides a response including the one or more particular optical code templates, or a links to the one or more particular optical templates. For example, the communication engine can provide the response to a source of the request (e.g., a dynamic optical code generation system).

FIGS. 9A-D depict examples of an optical code interface 900 for interactively creating an optical code. For example, the optical code interface 900 can include one or more graphical user interfaces (GUIs), physical buttons, scroll wheels, and the like, associated with one or more mobile computing devices (e.g., the one or more mobile computing devices implementing the functionality of a dynamic optical code generation system).

Figure 9A:
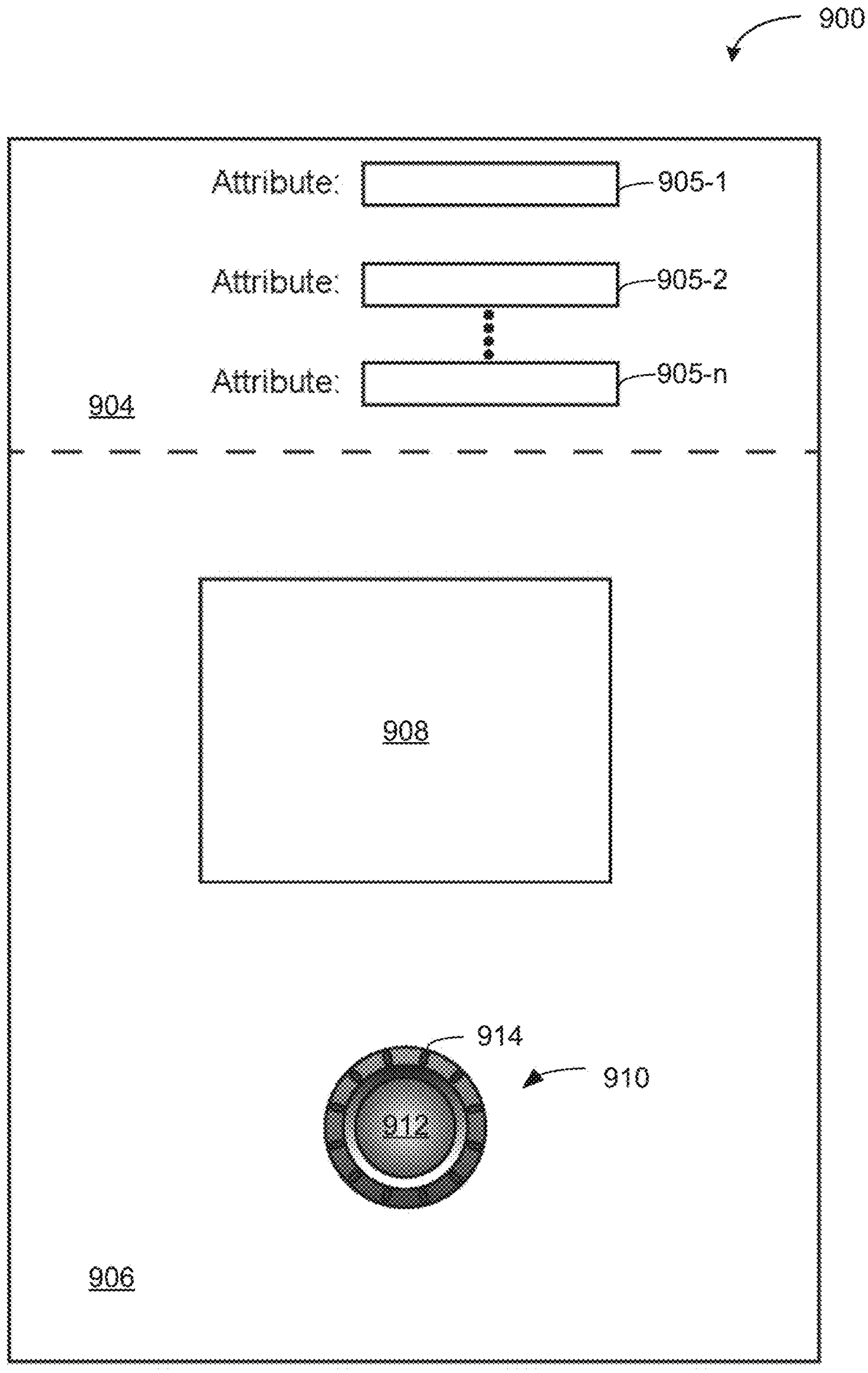
FIGS. 9A-D depict examples of an optical code interface for interactively creating an optical code.

In the example of FIG. 9A, the optical code interface 900 includes an optical code attribute region 904 and an optical code editing region 906. The optical code attribute region 904 includes graphical attribute objects 905-1 to 905-*n* (collectively, the attribute objects 905, individually, the attribute object 905). The graphical attribute objects 905 can include text fields, dropdown lists, or other graphical object configured to receive user input. In a specific implementation, the optical code attribute region 904 is configured to obtain and present optical code attributes through the graphical attribute objects 905 in response to user input.

In the example of FIG. 9A, the optical code editing region 906 includes an optical code palette region 908 and a graphical control object 910. In a specific implementation, the optical code palette region 908 functions to present an optical code as it is being created, and the graphical control object 910 functions to respond to user input (e.g., continuous input) to create a desired optical code aesthetic of an optical code. For example, a user can manipulate the graphical control object 910 to create the desired optical code aesthetic.

In the example of FIG. 9A, the graphical control object 910 includes an inner portion 912 and an outer portion 914. Manipulating the inner portion 912 can select an aesthetic feature from a set of aesthetic features. For example, aesthetic features can include shapes, patterns, colors, sizes, and orientations. In a specific implementation, manipulating the inner portion 912 along a z-axis can select a particular aesthetic feature. For example, graphically depressing the inner portion 912 can select a next aesthetic feature from a list of aesthetic features, and graphically pulling out the inner portion 912 can select a previous feature from a list of aesthetic features.

In various implementations, graphically depressing, graphically pulling, or otherwise manipulating the graphical control object 910, or other elements of the optical code interface 900, is controlled by one or more corresponding user inputs or portions of a continuous input. For example, a particular user input can be associated with particular control actions (e.g., graphically depressing, graphically pulling, graphically rotating, and the like). User inputs can be associated with corresponding control actions either manually (e.g., in response to user input) or automatically (e.g., based on default or predetermined associations).

In a specific implementation, manipulating the graphical control object 910 selects an aesthetic feature value for a currently selected aesthetic feature. For example, rotating the outer portion 914 can select an aesthetic feature value, such as a particular shape, pattern, color, size, or orientation.

Figure 9B:
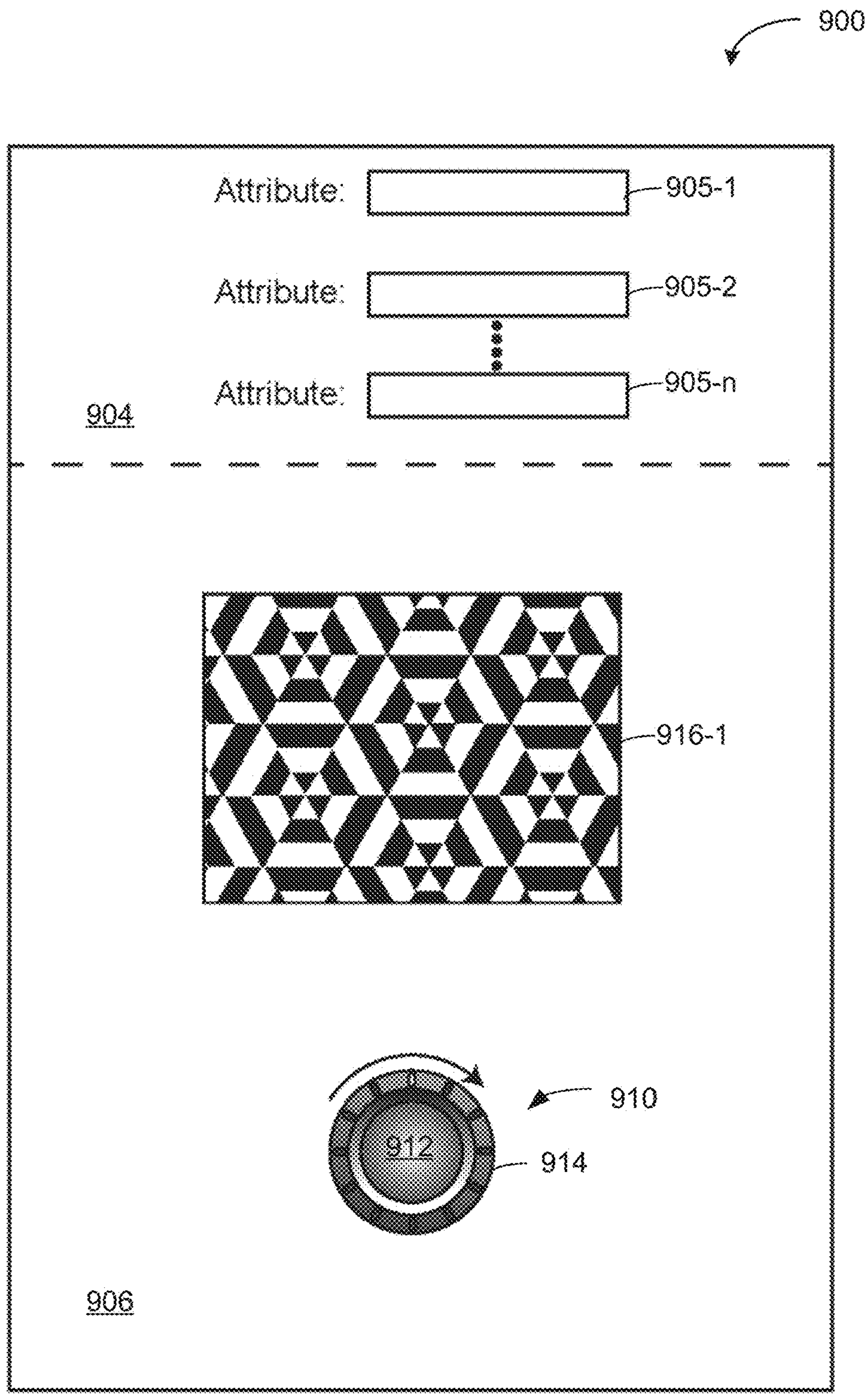
Figure 9C:
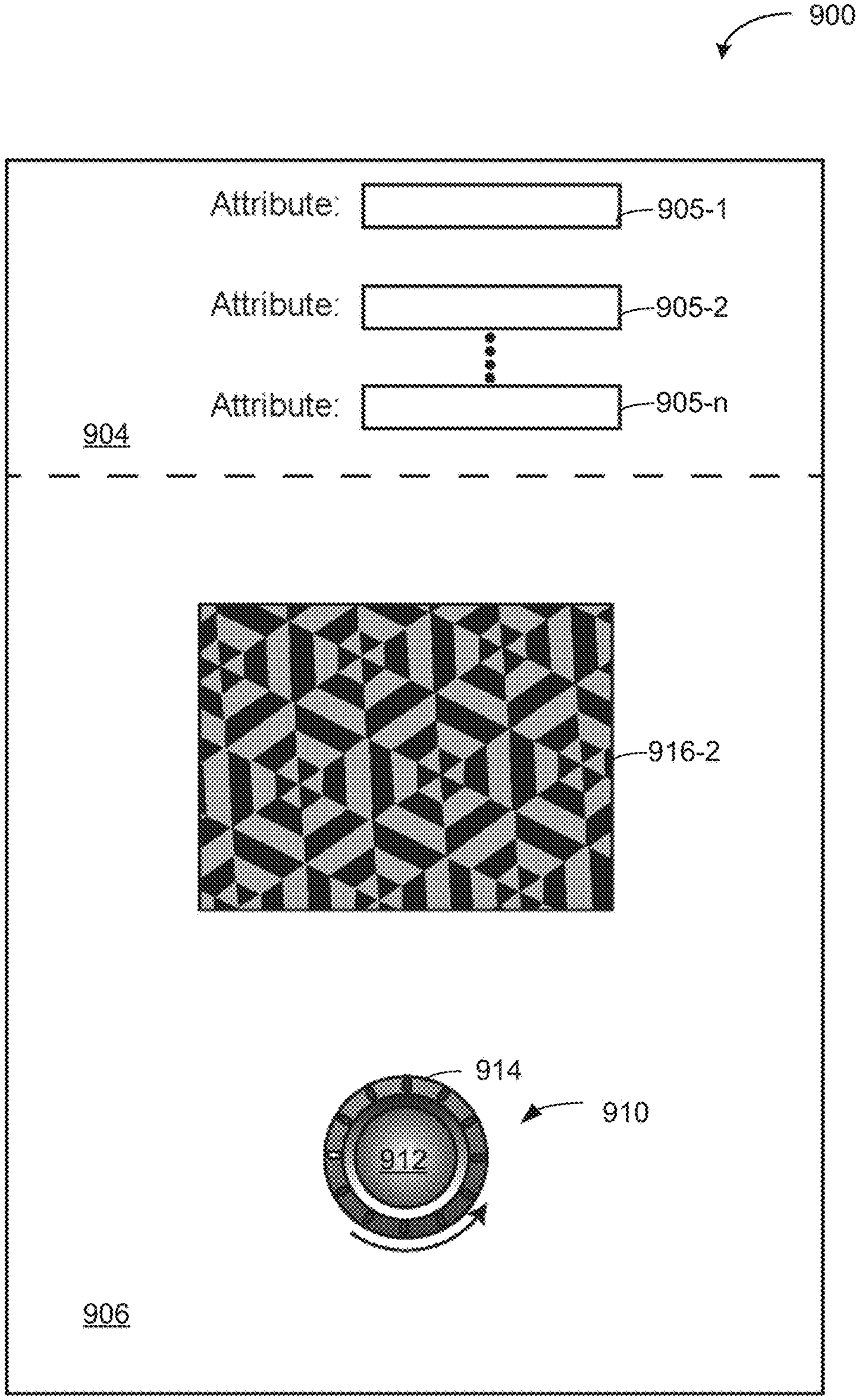
Figure 9D:
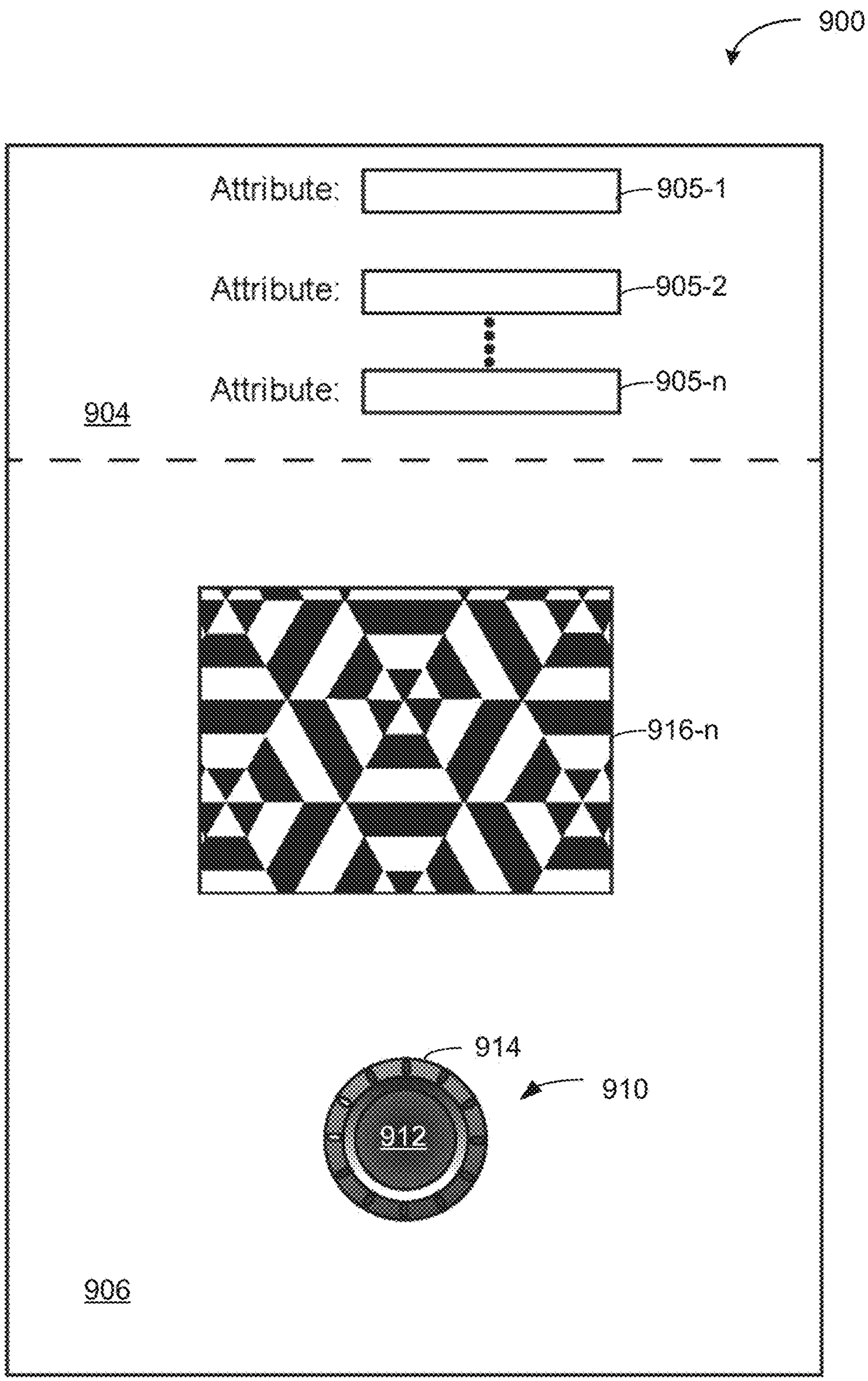

In the example of FIG. 9B, the optical code interface 900 presents an optical code 916-1 generated in response to user input (e.g., a portion of a continuous input), such as a manipulation of the control object 910. In the example of FIG. 9C, the optical code interface 900 presents an optical code 916-2 generated in response to additional user input (e.g., an additional portion of the continuous input associated with the optical code 918-1), such as a manipulation of the control object 910. For example, the optical code 916-2 may comprise an optical code resulting from one or more additional manipulations of the control object 910 relative to the manipulation(s) associated with the optical code 916-1. In the example of FIG. 9D, the optical code interface 900 presents an optical code **916-*n* having a desired optical code aesthetic. For example, the optical code 916-*n* may comprise an optical code resulting from one or more additional manipulations of the control object 910 relative to the manipulation(s) associated with the optical code 916-2**.

Figure 10:
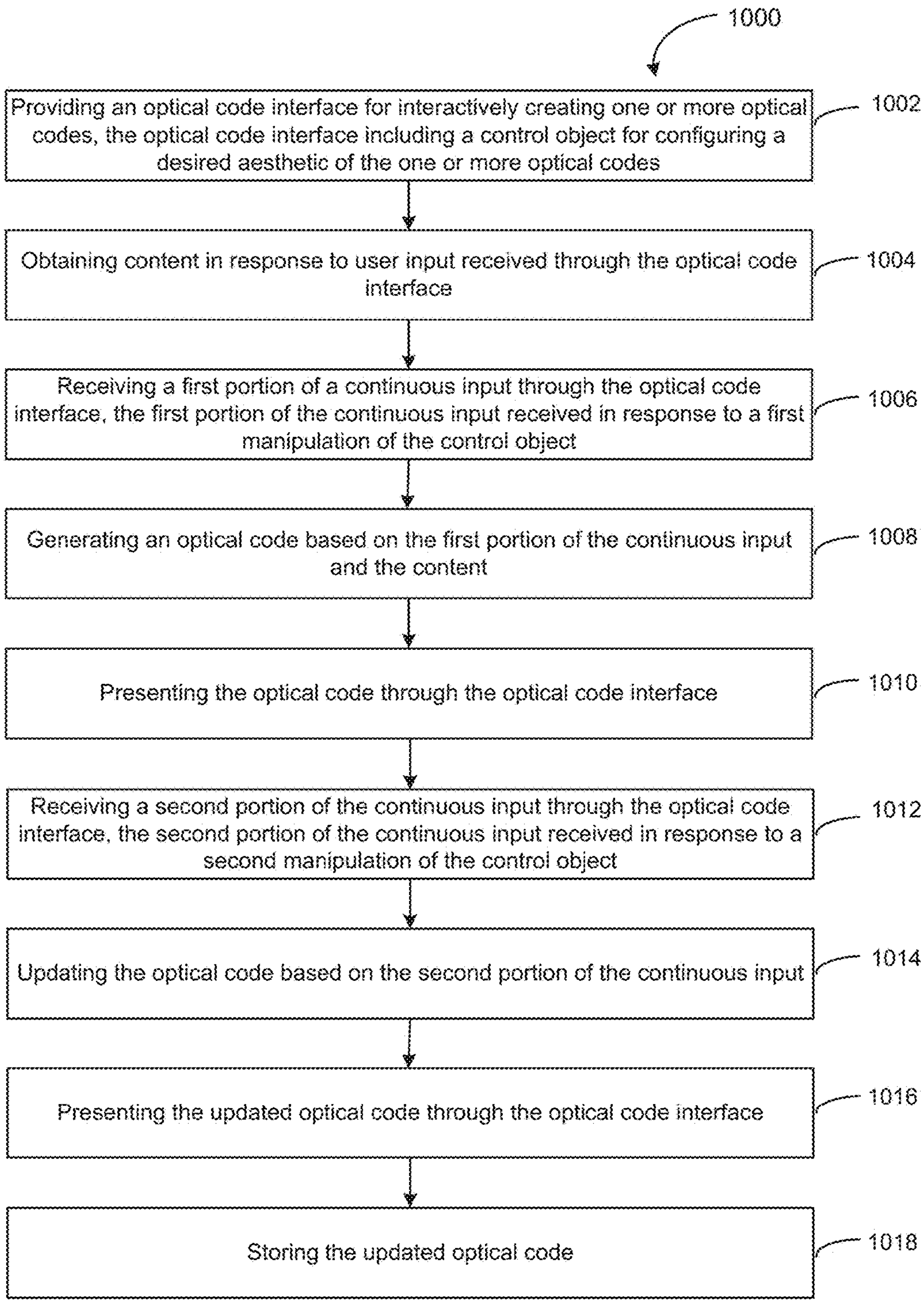
FIG. 10 depicts a flowchart of an example method for interactively creating an optical code.

FIG. 10 depicts a flowchart 1000 of an example method for interactively creating an optical code.

In the example of FIG. 10, the flowchart 1000 starts at module 1002 where a dynamic optical code generation system provides an optical code interface for interactively creating one or more optical codes, the optical code interface including a control object for configuring a desired optical code aesthetic of the one or more optical codes. In a specific implementation, an optical code interface engine provides the optical code interface.

In the example of FIG. 10, the flowchart 1000 continues to module 1004 where the dynamic optical code generation system obtains content in response to user input received through the optical code interface. In a specific implementation, the optical code interface engine obtains the content.

In the example of FIG. 10, the flowchart 1000 continues to module 1006 where the dynamic optical code generation system receives a first portion of a continuous input through the optical code interface, the first portion of the continuous input received in response to a first manipulation of the control object. In a specific implementation, the optical code interface engine receives the continuous input.

In the example of FIG. 10, the flowchart 1000 continues to module 1008 where the dynamic optical code generation system generates an optical code based on the first portion of the continuous input and the content. In a specific implementation, an optical code generation engine generates the optical code.

In the example of FIG. 10, the flowchart 1000 continues to module 1010 where the dynamic optical code generation system presents the optical code through the optical code interface. In a specific implementation, the optical code interface engine presents the optical code.

In the example of FIG. 10, the flowchart 1000 continues to module 1012 where the dynamic optical code generation system receives a second portion of the continuous input through the optical code interface, the second portion of the continuous input received in response to a second manipulation of the control object. In a specific implementation, the optical code interface engine receives the continuous input.

In the example of FIG. 10, the flowchart 1000 continues to module 1014 where the dynamic optical code generation system updates the optical code based on the second portion of the continuous input. In a specific implementation, an optical code generation engine updates the optical code.

In the example of FIG. 10, the flowchart 1000 continues to module 1016 where the dynamic optical code generation system presents the updated optical code through the optical code interface. In a specific implementation, the optical code interface engine presents the updated optical code.

In the example of FIG. 10, the flowchart 1000 continues to module 1018 where the dynamic optical code generation system stores the updated optical code.

Figure 11:
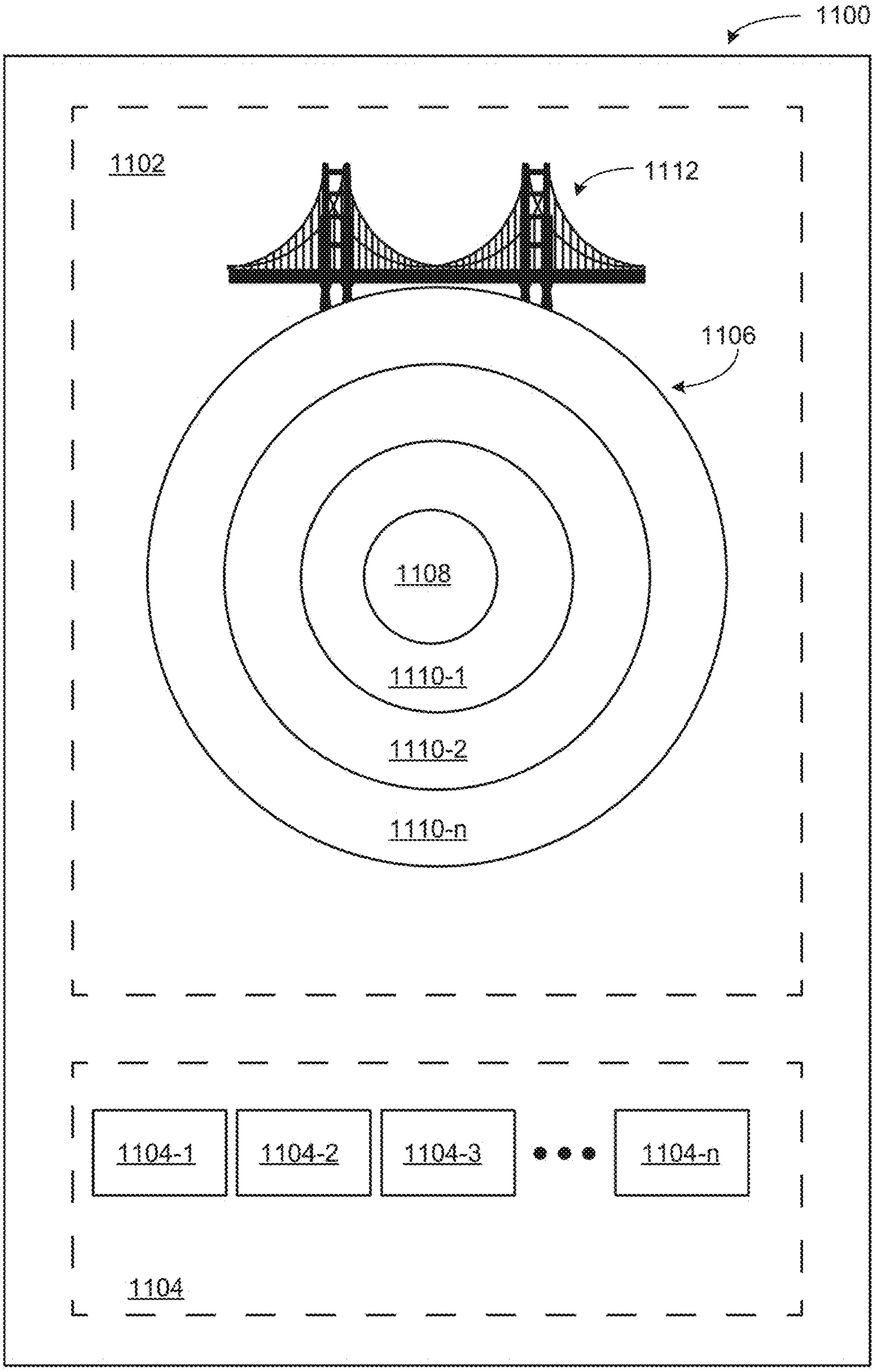
FIG. 11 depicts an example of an optical code interface for interactively creating an optical code.

FIG. 11 depicts an example of an optical code interface 1100 for interactively creating an optical code. For example, the optical code interface 1100 can include one or more graphical user interfaces (GUIs), physical buttons, scroll wheels, and the like, associated with one or more mobile computing devices (e.g., the one or more mobile computing devices implementing the functionality of a dynamic optical code generation system).

In the example of FIG. 11, the optical code interface 1100 includes an optical code editing region 1102 and an optical code attribute region 1104. The optical code editing region 1102 includes a graphical control object 1106. The graphical control object 1106 includes an inner portion 1108, outer portions 1110-1 to **1110-*n* (collectively, the outer portions 1110, individually, the outer portion 1110), and a context aesthetic object 1112. In a specific implementation, the inner portion 1108 comprises an optical code aesthetic generated by manipulating some or all of the outer portions 1110. In various implementations, some or all portions of the graphical control object 1106** comprise the optical code aesthetic.

In a specific implementation, the optical code attribute region 1104 includes optical code attributes 1104 (collectively, the optical code attributes 1104, individually, the outer optical attribute 1104). For example, optical attributes 1104 may comprise digits of a phone number, characters of an email address, or other contact attributes. In various implementations, the optical code attributes 1104 values may be input (e.g., 555-555-555) using a numeric or alphanumeric input system (e.g., a graphical keyboard), or some or all of the portions of the graphical control object 1106 may be manipulated to define optical code attribute 1104 values. For example, rotating an outer portion 1110 can select a first value for a first optical code attribute 1104-1, pushing or pulling the outer portion 1110 can select a second optical code attribute 1104-2, rotating the outer portion 1110 can select a second value of the second optical code attribute 1104-1, and so forth.

In a specific implementation, manipulating the graphical control object 1106 defines the optical code aesthetic in addition to, or instead of, defining the optical code attribute 1104 values. For example, the inner portion 1108 can define a pattern of the optical code aesthetic, the outer portion 1110-1 can define a color of the optical code aesthetic, the outer portion 1110-2 can define a shape of the optical code aesthetic, and the outer portion(s) 1110-*n* can define one or more additional optical code aesthetic features.

In the example of the FIG. 11, the context aesthetic object 1112 is generated based on some or all of the optical code attributes 1104 values. In a specific implementation, a predetermined portion of the optical code attributes 1104 (e.g., the first three attributes 1104 of a phone number attribute) may be used to generate the context aesthetic object 1112. For example, a graphical representation of the Golden Gate bridge may be generated if the first three optical code attribute values correspond to an area code associated with San Francisco. In a specific implementation, a predetermined set of context aesthetic objects is stored in a datastore, and the context aesthetic object 1112 is selected from the predetermined set of context aesthetic objects based on some or all of the optical code attribute 1104 values. Although the context aesthetic object 1112 shows a graphic of a bridge in the example of FIG. 11, it will be appreciated that this is for illustrative purposes, and the context aesthetic object 1112 may comprise other graphics.

For purposes of explanation, numerous specific details are set forth in order to provide a thorough understanding of the description. It will be apparent, however, to one skilled in the art that implementations of the disclosure can be practiced without these specific details. In some instances, systems, modules, engines, structures, processes, features, and devices are shown in block diagram form in order to avoid obscuring the description. In other instances, functional block diagrams and flow diagrams are shown to represent data and logic flows. The components of block diagrams and flow diagrams (e.g., steps, modules, blocks, structures, devices, features, etc.) may be variously combined, separated, removed, reordered, and replaced in a manner other than as expressly described and depicted herein.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the implementations is intended to be illustrative, but not limiting, of the scope, which is set forth in the claims recited herein. The techniques described in the preceding text and figures can be mixed and matched as circumstances demand to produce alternative implementations.

I claim:

1. A method comprising:

providing an optical code interface for interactively creating one or more optical codes, the optical code interface including a graphical control object for configuring a desired optical code aesthetic of the one or more optical codes;

obtaining content in response to user input received through the optical code interface;

receiving a first portion of a continuous input through the optical code interface, the first portion of the continuous input received in response to a manipulation of an inner portion of the graphical control object;

generating an optical code based on the first portion of the continuous input and the content, the generating including encoding the content in the optical code, the optical code having an optical code aesthetic determined based on the first portion of the continuous input;

presenting the optical code through the optical code interface;

receiving a second portion of the continuous input through the optical code interface, the second portion of the continuous input received in response to a manipulation of an outer portion of the graphical control object;

updating the optical code aesthetic of optical code based on the second portion of the continuous input, the optical code aesthetic of the optical code being updated subsequent to the encoding of the content in the optical code;

presenting the updated optical code through the optical code interface.

2. The method of claim 1, wherein the optical code interface comprises a graphical user interface, and the graphical control object comprises one or more graphical elements of the graphical user interface.

3. The method of claim 1, wherein the graphical control object comprises a graphical knob or a graphical button.

4. The method of claim 1, wherein the desired optical code aesthetic comprises any of one or more shapes, one or more patterns, and one or more colors.

5. The method of claim 1, wherein the encoding the content in the optical code comprises encoding a first portion of the content in a first region of the optical code and encoding a second portion of the content in a second region of the optical code.

6. The method of claim 1, wherein the manipulation of the inner portion of the graphical control object and the manipulation of the outer portion of the graphical control object each comprise a respective rotation of the graphical control object.

7. The method of claim 1, wherein the content comprises one or more content items associated with a subject, the content items including any of identifier items, media items, and social network items.

8. The method of claim 7, wherein the identifier items include contact information associated with the subject, and the media items include image data associated with the subject, and the social network items include a link to a social network profile associated with the subject.

9. The method of claim 1, wherein the optical code comprises a machine-readable and human-readable optical code.

10. A system comprising:

one or more processors; and memory storing instructions that, when executed by the one or more processors, cause the system to perform:

providing an optical code interface for interactively creating one or more optical codes, the optical code interface including a graphical control object for configuring a desired optical code aesthetic of the one or more optical codes;

obtaining content in response to user input received through the optical code interface;

receiving a first portion of a continuous input through the optical code interface, the first portion of the continuous input received in response to a manipulation of an inner portion of the graphical control object;

generating an optical code based on the first portion of the continuous input and the content, the generating including encoding the content in the optical code, the optical code having an optical code aesthetic determined based on the first portion of the continuous input;

presenting the optical code through the optical code interface;

receiving a second portion of the continuous input through the optical code interface, the second portion of the continuous input received in response to a manipulation of an outer portion of the graphical control object;

updating the optical code aesthetic of the optical code based on the second portion of the continuous input, the optical code aesthetic of the optical code being updated subsequent to the encoding of the content in the optical code;

presenting the updated optical code through the optical code interface.

11. The method of claim 10, wherein the optical code interface comprises a graphical user interface, and the graphical control object comprises one or more graphical elements of the graphical user interface.

12. The method of claim 10, wherein the graphical control object comprises a graphical knob or a graphical button.

13. The method of claim 10, wherein the desired optical code aesthetic comprises any of one or more shapes, one or more patterns, and one or more colors.

14. The method of claim 10, wherein the encoding the content in the optical code comprises encoding a first portion of the content in a first region of the optical code and encoding a second portion of the content in a second region of the optical code.

15. The method of claim 10, wherein the manipulation of the inner portion of the graphical control object and the manipulation of the outer portion of the graphical control object each comprise a respective rotation of the graphical control object.

16. The method of claim 10, wherein the content comprises one or more content items associated with a subject, the content items including any of identifier items, media items, and social network items.

17. The method of claim 10, wherein the optical code comprises a machine-readable and human-readable optical code.

18. A non-transitory computer readable medium comprising executable instructions, the instructions being executable by a processor to perform a method, the method comprising:

providing an optical code interface for interactively creating one or more optical codes, the optical code interface including a graphical control object for configuring a desired optical code aesthetic of the one or more optical codes;

obtaining content in response to user input received through the optical code interface;

receiving a first portion of a continuous input through the optical code interface, the first portion of the continuous input received in response to a manipulation of an inner portion of the graphical control object;

generating an optical code based on the first portion of the continuous input and the content, the generating including encoding the content in the optical code, the optical code having an optical code aesthetic determined based on the first portion of the continuous input;

presenting the optical code through the optical code interface;

receiving a second portion of the continuous input through the optical code interface, the second portion of the continuous input received in response to a manipulation of an outer portion of the graphical control object;

updating the optical code aesthetic of the optical code based on the second portion of the continuous input, the optical code aesthetic of the optical code being updated subsequent to the encoding of the content in the optical code;

presenting the updated optical code through the optical code interface.

19. The method of claim 1, wherein the manipulation of the inner portion of the graphical control object comprises selecting an aesthetic feature from a set of aesthetic features and the manipulation of the outer portion of the graphical control object comprises selecting an aesthetic feature value for the aesthetic feature.

20. The method of claim 1, wherein the manipulation of the inner portion of the graphical control object includes depressing the inner portion of the graphical control object or pulling out the inner portion of the graphical control object.

* * * * *